US010083768B2

(12) United States Patent
Tournant et al.

(10) Patent No.: US 10,083,768 B2
(45) Date of Patent: Sep. 25, 2018

(54) METHOD FOR CONTROLLING THE POSITIONS OF NUCLEAR FUEL ASSEMBLIES INSIDE A NUCLEAR REACTOR CORE, AND CORRESPONDING CONTROL ASSEMBLY

(75) Inventors: Audrey Tournant, Creot (FR); Frederic Alain Magre, Envermeu (FR); Benjamin Loriot, Saint Martin en Bresse (FR)

(73) Assignee: AREVA NP, Courbevoie (FR)

( * ) Notice: Subject to any disclaimer, the term of this patent is extended or adjusted under 35 U.S.C. 154(b) by 1283 days.

(21) Appl. No.: 13/812,281

(22) PCT Filed: Jul. 26, 2011

(86) PCT No.: PCT/FR2011/051793
§ 371 (c)(1),
(2), (4) Date: Apr. 8, 2013

(87) PCT Pub. No.: WO2012/022890
PCT Pub. Date: Feb. 23, 2012

(65) Prior Publication Data
US 2013/0195237 A1    Aug. 1, 2013

(30) Foreign Application Priority Data

Jul. 27, 2010  (FR) ...................................... 10 56132

(51) Int. Cl.
*G21C 17/10*  (2006.01)
*G21C 17/08*  (2006.01)
*G21C 19/19*  (2006.01)

(52) U.S. Cl.
CPC ............. *G21C 17/10* (2013.01); *G21C 17/08* (2013.01); *G21C 19/19* (2013.01)

(58) Field of Classification Search
CPC .......... G21C 17/10; G21C 19/19; G21C 17/08
USPC .......................................................... 376/258
See application file for complete search history.

(56) References Cited

U.S. PATENT DOCUMENTS 5,887,041 A * 3/1999 Zachar .................... G21C 17/00
376/245

FOREIGN PATENT DOCUMENTS

| EP | 1 884 957 | 2/2006 |
|----|-----------|--------|
| JP | 8 201571  | 8/1996 |
| JP | 2004 101315 | 4/2004 |

\* cited by examiner

*Primary Examiner* — Jack W Keith
*Assistant Examiner* — Lily Crabtree Garner
(74) *Attorney, Agent, or Firm* — Davidson, Davidson & Kappel, LLC (57) ABSTRACT

A method for controlling the positions of a plurality of nuclear fuel assemblies (1) relative to an upper core plate (3) in a nuclear reactor core, the method including the following steps:
choosing a reference point (13) in internals or in a reactor vessel;
determining the positions of S-shaped holes of the nuclear fuel assemblies (1) relative to the reference point (13), each S-shaped hole being intended to cooperate with a corresponding centering pin of the upper core plate (3);
acquiring the positions of the centering pins of the upper core plate (3) relative to the reference point (13); and
comparing the positions of the S-shaped holes and the positions of the pins and deducing therefrom whether the nuclear fuel assemblies (1) are correctly positioned relative to the upper core plate (3).

12 Claims, 7 Drawing Sheets

METHOD FOR CONTROLLING THE POSITIONS OF NUCLEAR FUEL ASSEMBLIES INSIDE A NUCLEAR REACTOR CORE, AND CORRESPONDING CONTROL ASSEMBLY

The present invention relates in general to methods for controlling the positions of nuclear fuel assemblies inside a nuclear reactor core.

BACKGROUND

The core of a nuclear reactor typically comprises of a plurality of prism shaped nuclear fuel assemblies, supported on a core support plate. Placed above the assemblies is an upper core plate (UCP) designed for, among other things, locking into position the top nozzles of the nuclear fuel assemblies.

Each of the top nozzles of the nuclear fuel assemblies typically includes two holes, called "S shaped hole", intended for cooperating with the centering pins of the upper core plate. The centering pins protrude under the upper core plate and is each engaged in an S shaped hole.

It is important for the nuclear fuel assemblies to be positioned properly inside the nuclear reactor core.

Indeed, during core loading operations, the nuclear fuel assemblies are first set in place inside the reactor core, and then the upper core plate and other reactor internals are replaced. During the setting in place of the upper core plate (UCP), the pins are engaged in the S shaped holes. If the pins and the S shaped holes of some assemblies are in an offset position relative to each other, the pins of the UCP can be entered with force in some S shaped holes.

This does not in any way interfere with the operation of the reactor, but during the subsequent shut down of the reactor, when the UCP is extracted out of the core, there is a risk of the nuclear fuel assemblies remaining attached to the upper plate of the core during the lifting of the UCP.

Such a situation is particularly problematic.

SUMMARY OF THE INVENTION

Thus, it is necessary carry out a highly reliable control of the positions of the nuclear fuel assemblies of the core in relation to the upper core plate, after loading of the assemblies into the core and before setting in place the upper core plate.

It is an object of the present invention to provide a method for controlling the positions of a plurality of nuclear fuel assemblies in relation to the upper core plate, which is quick and reliable.

The present invention provides a method for controlling the positions of a plurality of nuclear fuel assemblies in relation to an upper core plate in a nuclear reactor core, the method comprising of the following steps:
  choosing a reference point in the reactor internals or in a reactor vessel;
  determining the positions of the S shaped holes of the nuclear fuel assemblies relative to the reference point, each S shaped hole being intended to cooperate with a corresponding centering pin of the upper core plate;
  acquiring the positions of the centering pins of the upper core plate relative to the reference point;
  comparing the positions of the S shaped holes and the positions of the pins and deducing therefrom whether the nuclear fuel assemblies are correctly positioned in relation to the upper core plate.

The method may further include one or more of the following characteristic features, considered individually or in accordance with any technically possible combinations:
  the reference point is a guide pin integrally attached to a lining of the core, the guide pin being adapted so as to cooperate with a notch of the upper core plate in order to position the upper core plate in relation to the lining of the core,
  the positions of the S shaped holes relative to the reference point are determined by taking images of the nuclear fuel assemblies, and determining with the aid of said images the positions of the S shaped holes relative to the reference point,
  each image is adapted to provide the positions of the S shaped holes of at least one given nuclear fuel assembly and at least one S shaped hole of a nuclear fuel assembly adjacent to the given nuclear fuel assembly,
  an overall image of the plurality of nuclear fuel assemblies is developed from the various images of the nuclear fuel assemblies, the overall image providing the positions of all the S shaped holes of the plurality of nuclear fuel assemblies,
  the comparison of the positions of the S shaped holes and the positions of the pins is carried out by comparing the overall image of the plurality of nuclear fuel assemblies to a theoretical image of the upper core plate providing the positions of all of the centering pins corresponding to all the S shaped holes of the plurality of nuclear fuel assemblies,
  each nuclear fuel assembly is considered to be correctly positioned in relation to the upper core plate if the comparison of the position of each S shaped hole of said nuclear fuel assembly with the position of the corresponding pin indicates that the S shaped hole and the pin have a distance between them that is less than a predetermined limit, for example 8 millimeters,
  the images are taken by means of a digital image capturing apparatus, moved by a machine for loading nuclear fuel assemblies,
  the plurality of nuclear fuel assemblies comprise at least one quarter of the nuclear fuel assemblies of the core, and preferably at least half of them.

The invention relates to a second aspect of an assembly for controlling the positions of a plurality of nuclear fuel assemblies in relation to an upper core plate in a nuclear reactor core, comprising of the following:
  a device suitable for determining the positions of S shaped holes of nuclear fuel assemblies relative to a reference point, each S shaped hole being provided to cooperate with a corresponding centering pin of the upper core plate, the reference point being chosen in the reactor internals or in a reactor vessel,
  a device suitable for determining the positions of the centering pins of the upper core plate (3) relative to the reference point,
  a device suitable for comparing the positions of the S shaped holes and the positions of the pins, and deducing therefrom whether the nuclear fuel assemblies are correctly positioned relative to the upper core plate.

BRIEF DESCRIPTION OF THE DRAWINGS

Additional characteristic features and advantages of the invention will become apparent from the detailed description thereof which is given here below, by way of indication and without any limitation thereof, with reference to the accompanying figures, included among which.

DETAILED DESCRIPTION

As indicated above, the method of the invention aims to control the positions of a plurality of nuclear fuel assemblies 1 in relation to an upper core plate 3 in the core 5 of a nuclear reactor.

Figure 1:
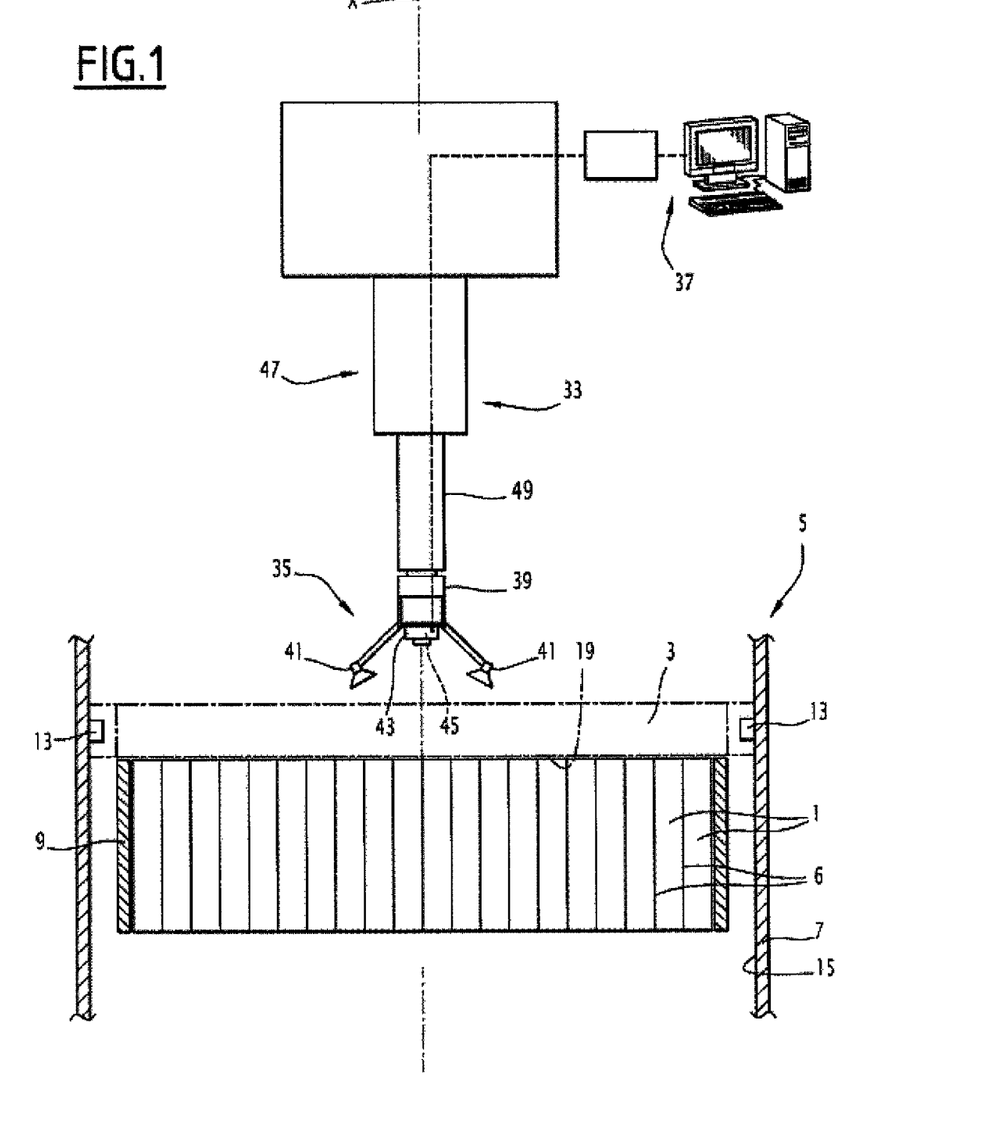
FIG. 1 is a schematic cross sectional representation of one section of the core of a nuclear reactor, and of a device to be used for implementing the control method of the invention, the upper core plate being shown in dotted lines in order to locate its position, the said plate not being in place at the time of the control.
Figure 2:
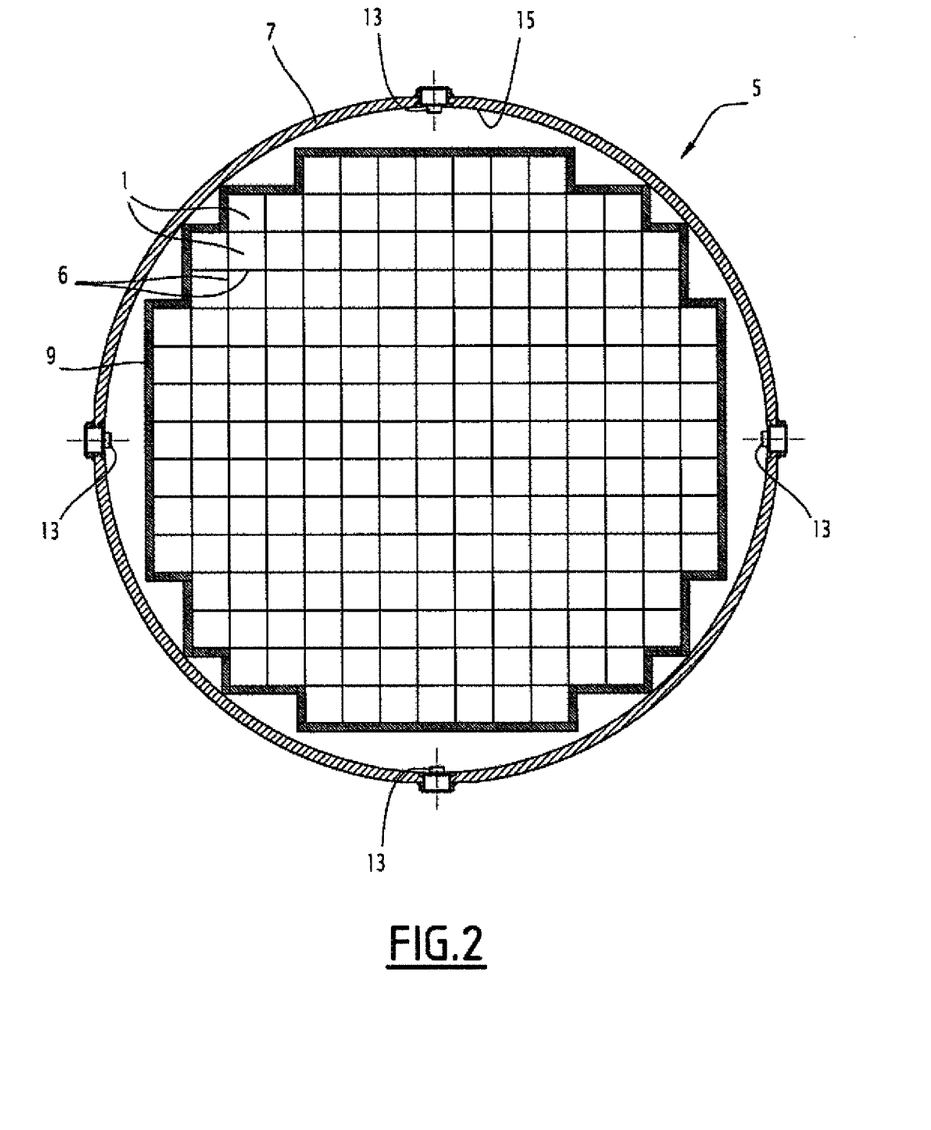
FIG. 2 is a schematic representation, in top view, of the section of the core shown in FIG. 1.

The core 5 of a nuclear reactor is shown partially in a schematic representation in FIGS. 1 and 2. The core 5 includes a large number of nuclear fuel assemblies 1, that are prism shaped. Each assembly 1 has an elongated shape along the central X axis of the nuclear reactor core. The assemblies 1 are positioned in the core of the nuclear reactor adjacent to each other, in a manner such that the lateral side faces 6 of two adjacent assemblies are opposite one another and in immediate proximity to one another.

Each assembly comprises a framework inside which the nuclear fuel rods are placed. The framework includes, among other things, a top nozzle and a bottom nozzle.

The assemblies 1 are supported by their bottom nozzles on a core base plate, not shown. The upper core plate 3 is axially positioned immediately above the assemblies 1.

The core also has a core lining 7 substantially cylindrical, coaxial with the X axis. The lining 7 helps to channel the circulation of the primary fluid in the reactor core. The partition 9 is placed around the fuel assemblies 1, between the assemblies 1 and the lining 7 of the core. The partition 9 performs the function of locking the assemblies 1 in position, and helps to channel the circulation of the primary fluid through the assemblies. The assemblies are positioned in the core in a regular manner, for example based on a square mesh grid.

Figure 3:
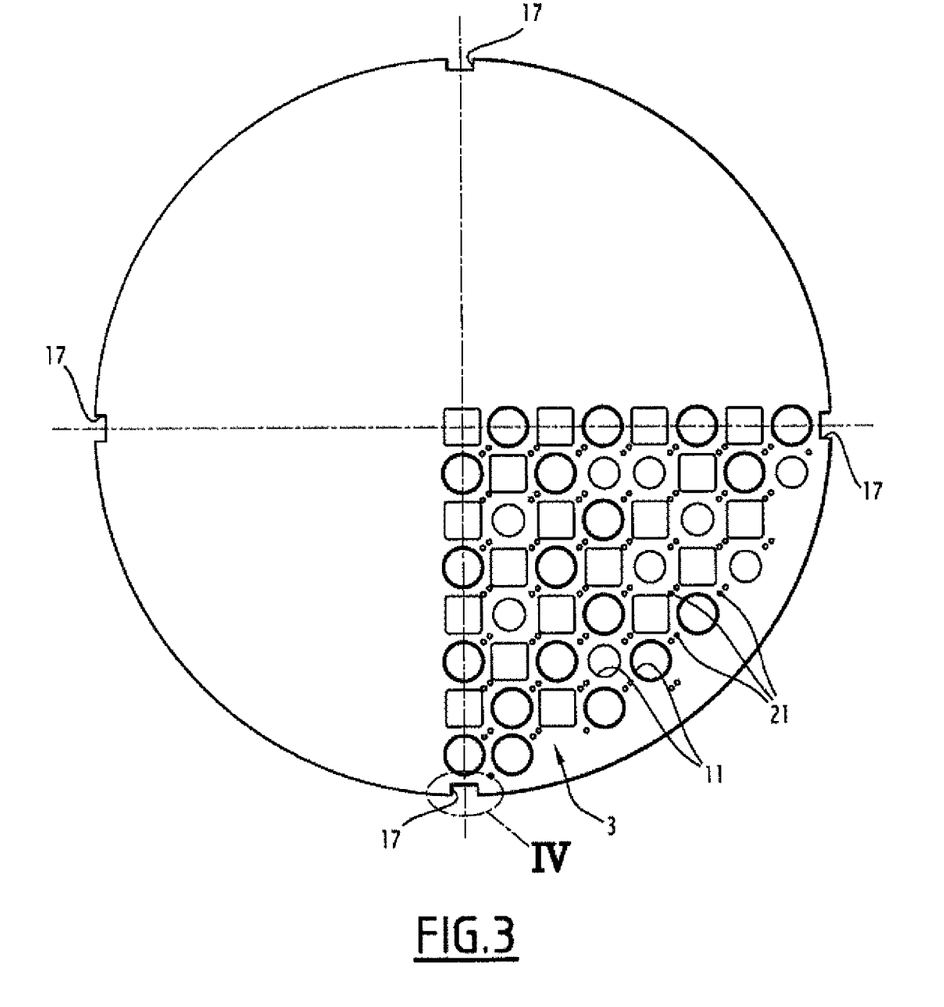
FIG. 3 is a bottom view of the upper core plate shown in FIG. 1, only a section of the details of the plate being shown.

The upper core plate 3, as shown in FIG. 3, is a substantially circular plate with outer diameter substantially corresponding to the internal diameter of the core lining 7. It is centred on the X axis and is substantially perpendicular to the X axis. It has a plurality of orifices 11, for example provided for the passage of the guide tubes of the reactivity control rod clusters of the reactor, or for the circulation of the primary fluid. Only one portion of the orifices 11 is shown in FIG. 3.

Figure 4:
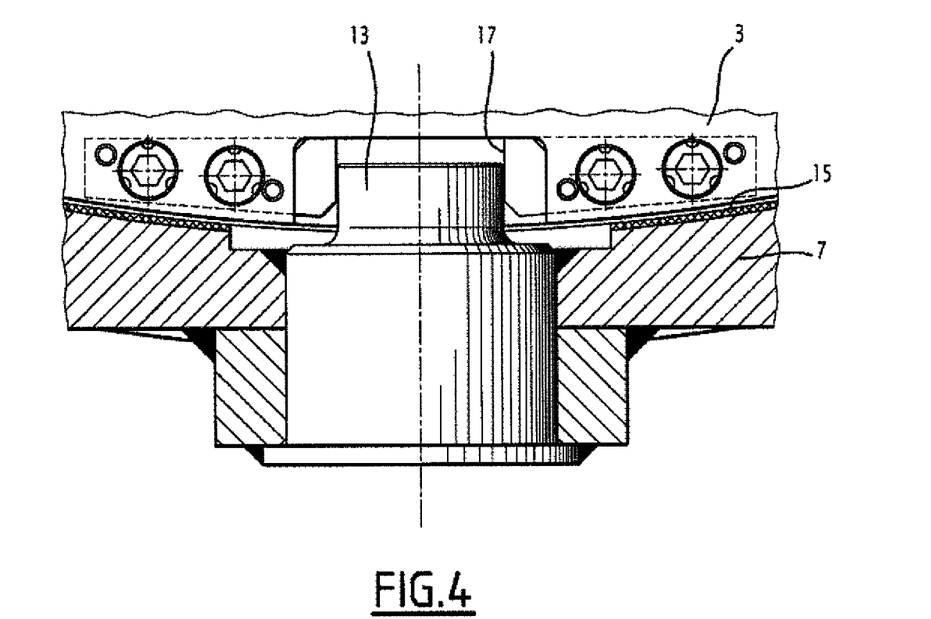
FIG. 4 is an enlarged view of a detail IV of FIG. 3, represented cross sectionally, an indexing pin of the plate also being represented.
Figure 5:
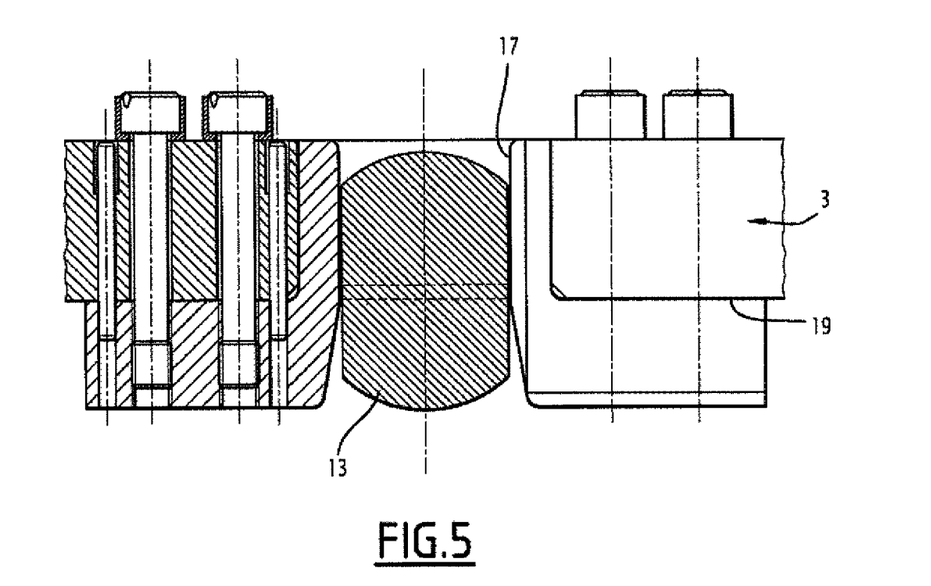
FIG. 5 is a side view, represented in partial cross-section, of the detail shown in FIG. 4.

The core support plate 3 is locked in position angularly around the central X axis relative to the core lining 5 by pins 13 rigidly fixed to the core lining. The pins 13 protrude radially towards the interior of the core lining 7 relative to the radially inner surface 15 of the core lining (FIGS. 2, 4, 5).

They cooperate with the notches 17, formed at the periphery of the upper core plate 3. As seen in FIGS. 4 and 5, the notches 17 each have a circumferential width that is slightly greater than that of the guide pins 13. The notches 17 extend axially across the entire thickness of the upper core plate. The pins 13 are engaged in the notches 17, the upper core plate 3 being thus locked in rotation relative to the core lining 5 and axially free in relation to the latter.

Figure 6:
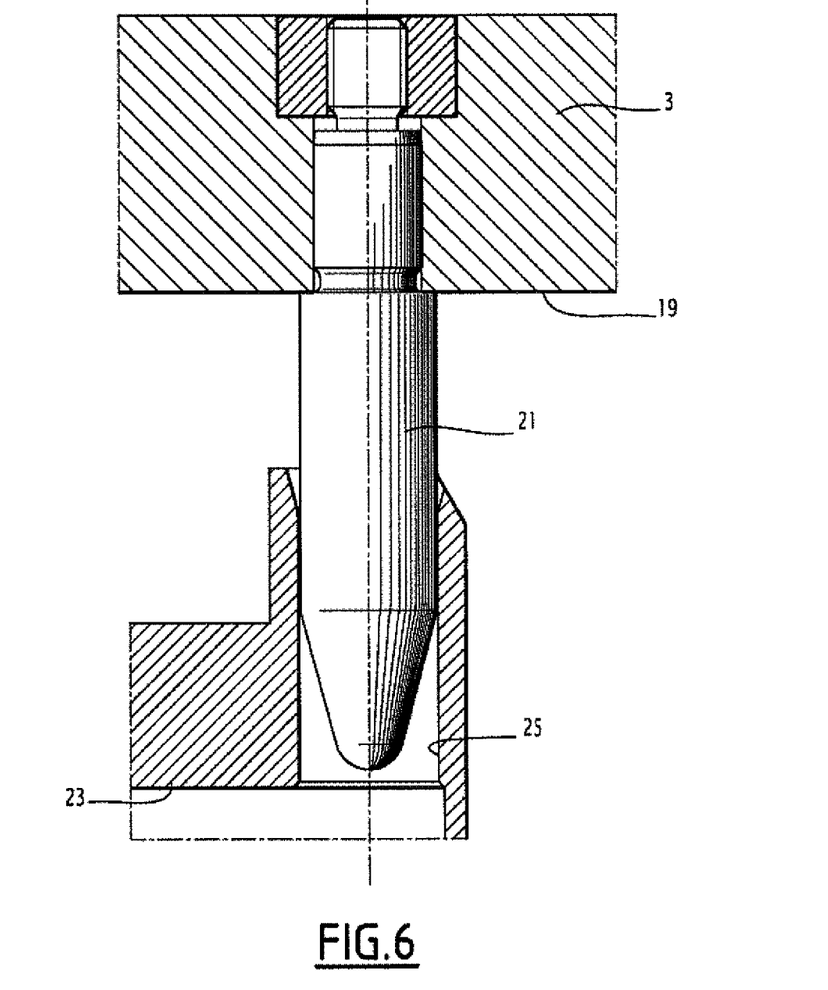
FIG. 6 is an enlarged view of a pin of the upper core plate engaged in an S shaped hole of an upper nozzle of a nuclear fuel assembly.
Figure 8:
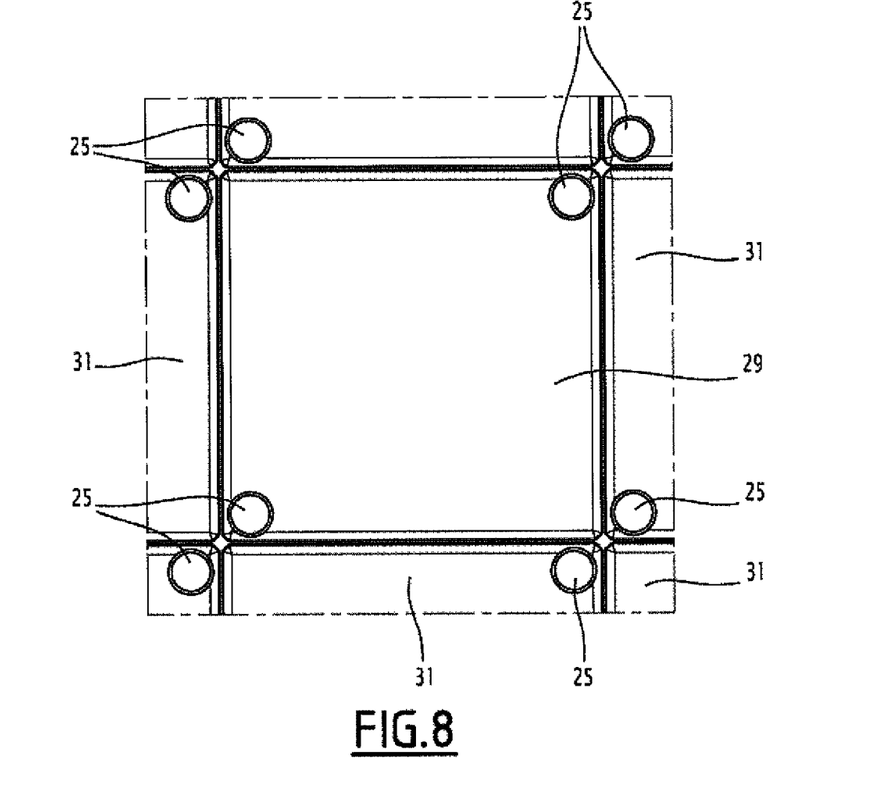
FIG. 8 shows an example of the capturing of the depicted images.

The upper core plate 3 has on its underside surface 19 facing towards the nuclear fuel assemblies 1 a plurality of centering pins 21 (FIG. 6). The pins 21 protrude from the underside surface 19 towards the fuel assemblies. Each of the top nozzles 23 of the fuel assemblies typically have two holes 25 each meant for receiving a pin 21, called S shaped holes. As shown in FIG. 8, seen in cross sectional view perpendicular to the X axis, the top nozzles 23 have a square cross section, the S shaped holes 25 being located at two opposite corners of said section. The S shaped holes 25 are open at the top, that is to say, towards the upper core plate, as shown in FIG. 6. The pins 21 each perform the function of maintaining in position the top nozzle of an assembly 1.

Figure 9:
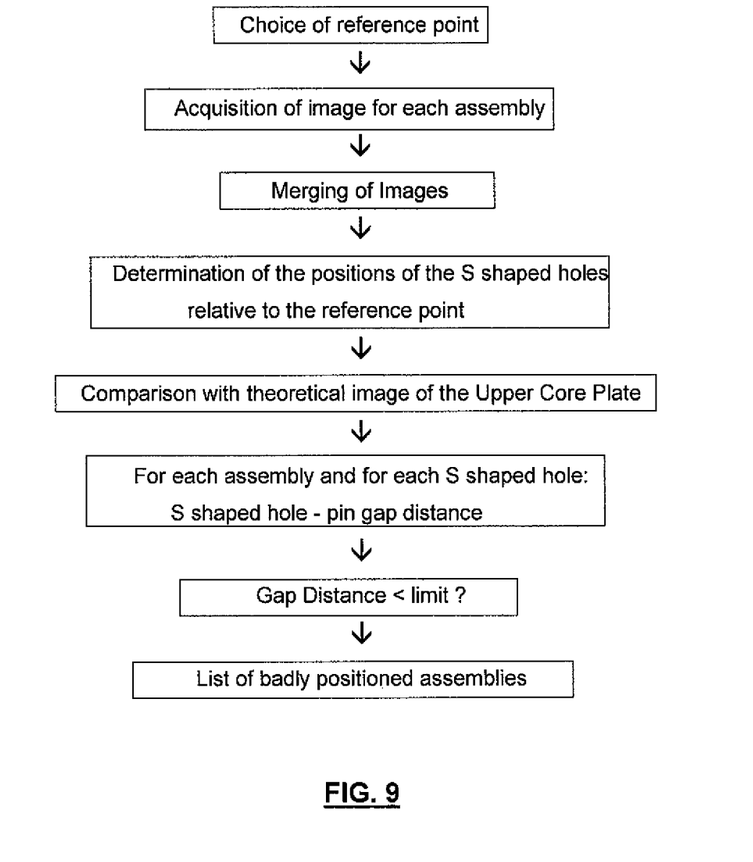
FIG. 9 is a diagram of the steps, indicating the main steps of the method described underlying the invention.

The control method of the invention, the main steps of which are identified in FIG. 9, is aimed at verifying that the nuclear fuel assemblies, after loading in the core, are well positioned relative to the upper core plate 3. More specifically, the method is designed to determine whether the S shaped holes 25 of the nuclear fuel assemblies are correctly positioned relative to the pins 21 of the upper core plate.

The method comprises the following steps:
choosing a reference point in the reactor internals or in a reactor vessel;
determining the positions of the S shaped holes 25 of the nuclear fuel assemblies relative to the reference point;
acquiring the positions of the centering pins 21 of the upper core plate relative to the reference point;
comparing the positions of the S shaped holes 25 and the positions of the pins 21;
deducing therefrom whether the nuclear fuel assemblies are correctly positioned in relation to the upper core plate.

The reference point is preferably an element whose position is known with good precision in relation to the upper core plate. Typically, the reference point is one of the guide pins 13 that enable the indexing of the upper core plate in position relative to the core lining. Typically, the uncertainty with respect to the positions of the pins 21 relative to the centering pins 13 is of the order of 1 millimeter.

Determination of the positions of the S shaped holes 25 of the nuclear fuel assemblies in relation to the reference point is carried out by taking images of the assemblies 1, and determining with the aid of said images the positions of the S shaped holes relative to the reference point.

More specifically, an image is acquired for each fuel assembly 1. The image capturing device is placed above the top nozzle 23 of the assembly to be photographed, the optical axis of the image capturing apparatus being substantially parallel to the central X axis. Each acquired image is of an appropriate size so as to allow the identification on the said image of the S shaped holes of the assembly photographed, and of at least one S shaped hole 25 of a nuclear fuel assembly adjacent to the assembly photographed. As shown in FIG. 8, when the assemblies are arranged in a square mesh grid, each assembly 29 is surrounded by eight adjacent assemblies 31. The top nozzle of each assembly has two S shaped holes 25 disposed at two corners of the nozzle situated along a diagonal. Typically, all of the assemblies are arranged based on the same orientation, in a manner such that the S shaped holes 25 of the different assemblies S are located along the same diagonal. Thus, several of the assemblies 31 adjacent to the assembly 29 have one S shaped hole 25 on the edges adjoining the assembly 29. In the example shown in FIG. 8, six of the assemblies adjacent to the assembly 29 have one S shaped hole 25 adjoining the assembly 29.

Thus, in this example, the image of the assembly 29 allows not only the identification of the two S shaped holes of the assembly 29, but also of one S shaped hole for six of the adjacent assemblies.

Figure 7:
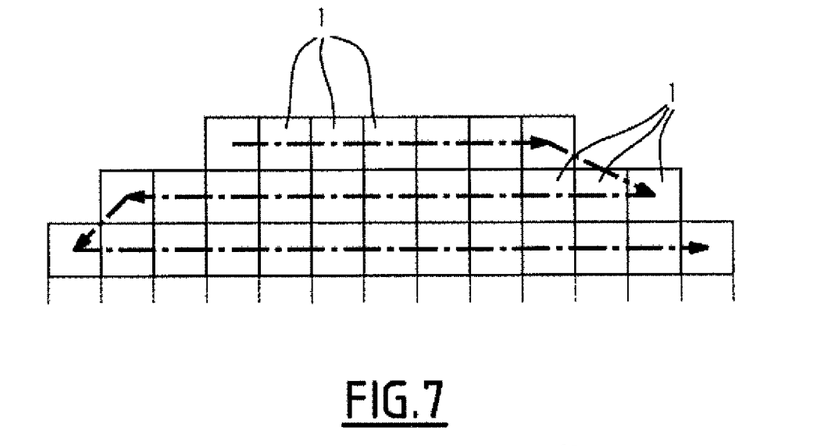
FIG. 7 is a schematic diagram showing the order in which the depicted images of the nuclear fuel assemblies have been taken.

As shown in FIG. 7, images are acquired on an assembly by assembly basis, following a predefined order. For example, the assemblies are processed row by row. Getting through a first row thus involves starting from the assembly situated at a first end of the row. The adjacent assembly is subsequently photographed, and this is continued through the row right until the assembly situated at the second end of the row. The adjacent row is then processed, for example in the opposite direction. Such an S oriented path helps to minimise the travel time of the image capturing apparatus from one assembly to another.

Once the images of each of the nuclear fuel assemblies have been acquired, a comprehensive overall image of all the nuclear fuel assemblies is created from the previously acquired images. The overall image provides the positions of all the S shaped holes of all the nuclear fuel assemblies in relation to each other. The overall image is computationally created by merging the acquired images.

The positions in the various images in relation to each other may be adjusted with precision due to the fact that each image includes S shaped holes 25 that also appear in other images, as indicated here above.

The positions of the S shaped holes relative to the reference point is then determined from the overall image. In order to do this, it is necessary to know with precision the position of at least one S shaped hole 25 relative to the reference point.

This position may be determined in multiple ways. For example, it is possible to acquire an additional image, showing both the guide pin serving as a reference point and the holes 25 of an assembly located in the proximity of the pin 13.

Alternatively, it is possible to acquire an image showing the position of the holes 25 of an assembly in relation to an element of the core whose position relative to the guide pin is accurately known. This element can for example be an element of the partition 9. It is also possible to use for this purpose one of the images acquired for an assembly located next to the partition.

Comparison of the positions of the S shaped holes and the positions of the pins is carried out by comparing the previously developed overall image with a theoretical image of the upper core plate providing the positions of the different centering pins in relation to the reference point. This image is typically a predetermined digital image, stored in a database. For example, it is reconstructed from the manufacturing drawings of the elements of the nuclear reactor core, in particular the manufacturing drawings for the lining of the core and the upper core plate.

The comparison is done by superimposing the overall image on the theoretical image of the upper core plate. The superimposing is automatically performed on a computer. As a variant, the superimposing is done manually, by an operator.

Subsequently, for each S shaped hole 25 of each assembly, the gap between the S shaped hole and the corresponding pin 21 of the upper core plate 3 is determined. To do this, for example, the distance between the centre of the S shaped hole 25 and the centre of the corresponding pin 21 in the superimposition is considered, as it is derived from the superimposition of the theoretical image and the overall image. Said positions correspond to the positions in a plane substantially perpendicular to the central X axis of the reactor core. The gap corresponds to the distance between the two centres in said plane perpendicular to the X axis. The gap distance is calculated automatically, or determined graphically by an operator.

Subsequently, the distances found for each S shaped hole are compared to a predetermined limit. The limit is for example equal to 8 millimeters, preferably equal to 4 millimeters, and more preferably equal to 2 millimeters.

If the distance found for one of the S shaped holes of an assembly is greater than the limit, the assembly is considered to be badly positioned relative to the upper core plate. If instead the distances found for all the S shaped holes of an assembly are less than the limit, the assembly is considered to be well positioned relative to the upper core plate.

The method makes it possible to provide a list of all the S shaped holes 25 which are out of tolerance, that is to say for which the calculated distances are greater than the predetermined limit. The method also makes it possible to provide a list of badly positioned assemblies, possibly with the identification numbers of the badly positioned assemblies. The method can also provide the gaps between assemblies, calculated from the positions of the S shaped holes 25 of the various assemblies.

The method described here above can be implemented by means of the device shown schematically in FIG. 1. The device 33 comprises an image capturing device 35, and a computer 37. The image capturing device 35 comprises a support 39, the illumination means 41 fixed to the support 39, a sealed housing 43 fixed on the support 39, and a digital image capturing apparatus 45 disposed in the interior of the sealed housing. The image capturing device 35 is designed to be moved by the machine 47 for loading nuclear fuel assemblies in the reactor core. In order to do this, the support 39 comprises a coupling member provided to cooperate with the mast 49 of the loading machine 47.

The device 33 has been designed in order that the lighting power intensity 41 may be adjusted from the computer 37, for example depending on the surface condition of the nuclear fuel assemblies.

The image capturing apparatus is for example a digital photographic apparatus, for example having a resolution of 18 million pixels, allowing for a resolution of 0.1 millimeter per pixel in the operating conditions envisaged. These conditions are as follows:

field of view for each image of approximately 300 millimeters/400 millimeters;

a distance of about 2 meters between the lens of the camera 45 and the top nozzle of the assembly to be photographed;

a focal length of around 100 millimeters.

The apparatus could also be a digital camera.

The photographic apparatus 45 is connected to the computer 37 via a digital connection, allowing for the exchange of data between the computer and the photo apparatus. This link is for example of the Ethernet connection type. The device is adapted so as to allow remote control of the photographic apparatus by means of the computer 37 and the feeding back of images from the photographic apparatus 45 to the computer 37.

The housing 43 is connected to a ventilation system, not shown, and maintained at an internal pressure of 2 bar.

The computer 37 is programmed for the following:

controlling the acquisition of images by the photographic apparatus for each nuclear fuel assembly;

from the acquired images, merging of the images in a manner so as to form the overall image of the nuclear fuel assemblies;

determining the positions of the S shaped holes relative to the reference point, from the overall image and, for example, from an image giving the position of at least one S shaped hole relative to the reference point;

storing the theoretical image of the upper core plate;

superimposing the overall image over the theoretical image of the upper core plate;

comparing the previously determined positions of the S shaped holes to the positions of the pins deriving from the theoretical image of the upper core plate;

determining the gap distances between each S shaped hole and the corresponding pin;

comparing the gap distances determined to the predetermined limit;

providing a list of S shaped holes that are badly positioned relative to the corresponding pins, the list of assemblies that are badly positioned relative to the upper core plate, possibly the identification details of the badly positioned nuclear fuel assemblies, and possibly calculating the gaps between assemblies.

Since the control method includes a step for determining the positions of the S shaped holes of the nuclear fuel assemblies relative to a reference point in the internals or in the reactor vessel, and a step for acquiring the positions of the centering pins of the upper core plate relative to the same point reference, it is possible to perform a very precise comparison of the positions of S shaped holes and the positions of the corresponding pins.

The use as a reference point of the guide pin of the upper core plate is particularly well suited, because the position of the upper core plate relative to this pin is known in a precise manner.

The positions of the S shaped holes relative to the reference point can be determined in a rapid and convenient manner by taking images of the assemblies with the help of appropriate equipment. The use of an overall image of the nuclear fuel assemblies, developed by merging the various images taken with the help of the image capturing device, makes it possible to perform a quick and accurate comparison with the position of the pins of the upper core plate. This allows for accelerating the process.

The overall image can be constructed with a good degree of accuracy if each image taken with the image capture device not only gives the positions of the S shaped holes of a particular assembly, but also of at least one S shaped hole of another assembly, serving as a benchmark for the juxta-position of the different images.

The method is particularly rapid, the time necessary for implementation being for example about four hours for the entire nuclear reactor core. This is particularly important because controlling the position of nuclear fuel assemblies in relation to the upper core plate is on the critical path during unloading and reloading of nuclear fuel assemblies in the reactor core. Due to the fact that the positions of the S shaped holes relative to the pins are accurately determined, the risk of the nuclear fuel assemblies getting stuck during the lifting of the upper core plate is minimised.

In any event, for reasons of economy, the method is applied to at least a quarter of the nuclear fuel assemblies of the core, and preferably to at least half of the nuclear fuel assemblies of the core, and more preferably to the entire amount of nuclear fuel assemblies of the core.

By way of a variant, the size of each image can be adapted in order to allow the viewing of two adjacent assemblies, and thus to enable the determination of positions of the S shaped holes of the two assemblies. The size of the images may also be adapted in order to allow the viewing of four or more assemblies, provided that the resolution of the image capturing apparatus is sufficient for this purpose.

What is claimed is:

1. A method for controlling positions of a plurality of nuclear fuel assemblies in relation to an upper core plate in a nuclear reactor core, the method comprising of the following steps:

choosing a reference point in reactor internals or in a reactor vessel;

determining positions of S shaped holes of the nuclear fuel assemblies relative to the reference point, each S shaped hole being intended to cooperate with a corresponding centering pin of the upper core plate;

acquiring positions of the centering pins of the upper core plate relative to the reference point;

directly comparing the position of each of the S shaped holes relative to the reference point and the position of the respective centering pin relative to the reference point and deducing therefrom whether each of the individual nuclear fuel assemblies is correctly positioned in relation to the upper core plate.

2. The method as recited in claim 1 wherein the reference point is a guide pin integrally attached to a lining of the core, the guide pin being adapted so as to cooperate with a notch of the upper core plate in order to position the upper core plate in relation to a lining of the core.

3. The method as recited in claim 1 wherein the positions of the S shaped holes relative to the reference point are determined by taking images of the nuclear fuel assemblies, and determining with the aid of said images the positions of the S shaped holes relative to the reference point.

4. The method as recited in claim 3 wherein each image is adapted to provide positions of the S shaped holes of at least one given nuclear fuel assembly and at least one S shaped hole of a nuclear fuel assembly adjacent to the given nuclear fuel assembly.

5. The method as recited in claim 3 wherein an overall image of the plurality of nuclear fuel assemblies is developed from the images of the nuclear fuel assemblies, the overall image providing the positions of all of the S shaped holes of the plurality of nuclear fuel assemblies.

6. The method as recited in claim 5 wherein the comparison of the positions of the S shaped holes and the positions of the pins is carried out by comparing the overall image of the plurality of nuclear fuel assemblies to a theoretical image of the upper core plate providing the positions of all of the centering pins corresponding to all the S shaped holes of the plurality of nuclear fuel assemblies.

7. The method as recited in claim 6 wherein each nuclear fuel assembly is considered to be correctly positioned in relation to the upper core plate if the comparison of the position of each S shaped hole of said nuclear fuel assembly with the position of the corresponding pin indicates that the S shaped hole and the pin have a distance between them that is less than a predetermined limit.

8. The method as recited in claim 7 wherein the predetermined limit is 8 millimeters.

9. The method as recited in claim 3 wherein the images are taken by a digital image capturing apparatus moved by a machine for loading the nuclear fuel assemblies.

10. The method as recited in claim 1 wherein the plurality of nuclear fuel assemblies comprise at least one quarter of the nuclear fuel assemblies of the core.

11. The method as recited in claim 10 wherein the plurality of nuclear fuel assemblies comprise at least half of the nuclear fuel assemblies of the core.

12. An assembly for controlling positions of a plurality of nuclear fuel assemblies in relation to an upper core plate in a nuclear reactor core, the control assembly comprising:
- a determiner for determining the positions of S shaped holes of nuclear fuel assemblies relative to a reference point, each S shaped hole being provided to cooperate with a corresponding centering pin of the upper core plate, the reference point being chosen in reactor internals or in a reactor vessel;
- a determiner for determining the positions of the centering pins of the upper core plate relative to the reference point; and
- a comparator for directly comparing the position of each of the S shaped holes relative to the reference point and the position of the respective centering pin relative to the reference point, and deducing therefrom whether each of the individual nuclear fuel assemblies is correctly positioned in relation to the upper core plate.

* * * * *